(12) United States Patent  
Parnaby

(10) Patent No.: US 8,711,876 B2
(45) Date of Patent: Apr. 29, 2014

(54) METHOD OF SYNCHRONIZATION FOR LOW POWER IDLE

(75) Inventor: Gavin Parnaby, Irvine, CA (US)

(73) Assignee: Marvell International Ltd., Hamilton (BM)

(*) Notice: Subject to any disclaimer, the term of this patent is extended or adjusted under 35 U.S.C. 154(b) by 27 days.

(21) Appl. No.: 13/616,425

(22) Filed: Sep. 14, 2012

(65) Prior Publication Data

US 2013/0016736 A1 Jan. 17, 2013

Related U.S. Application Data

(63) Continuation of application No. 12/583,087, filed on Aug. 11, 2009, now Pat. No. 8,270,389.

(60) Provisional application No. 61/188,717, filed on Aug. 11, 2008.

(51) Int. Cl.
*H04L 12/66* (2006.01)

(52) U.S. Cl.
USPC ............ 370/463; 370/350; 370/324; 370/503

(58) Field of Classification Search
None
See application file for complete search history.

(56) References Cited

U.S. PATENT DOCUMENTS

| | | | |
|---|---|---|---|
| 3,916,095 A | 10/1975 | Weber et al. |
| 4,583,235 A | 4/1986 | Dömer et al. |
| 5,301,193 A | 4/1994 | Toyofuku et al. |
| 5,737,323 A | 4/1998 | Lansdowne |
| 5,778,191 A | 7/1998 | Levine et al. |
| 5,822,371 A | 10/1998 | Goldstein et al. |
| 5,862,179 A | 1/1999 | Goldstein et al. |
| 6,009,126 A | 12/1999 | Bezooijen |
| 6,032,197 A | 2/2000 | Birdwell et al. |
| 6,088,345 A | 7/2000 | Sakoda et al. |
| 6,201,831 B1 | 3/2001 | Agazzi et al. |
| 6,212,398 B1 | 4/2001 | Roberts et al. |
| 6,226,332 B1 | 5/2001 | Agazzi et al. |
| 6,249,544 B1 | 6/2001 | Agazzi et al. |

(Continued)

FOREIGN PATENT DOCUMENTS

| | | |
|---|---|---|
| KR | 10-0263410 | 8/2000 |
| KR | 10-2006-0017222 | 2/2006 |

OTHER PUBLICATIONS

Zimmerman et al.;(10GBase-T Active/Low-Power Idle Toggling); 2008; pp. 1-15.*

(Continued)

*Primary Examiner* — Ricky Ngo
*Assistant Examiner* — Dewanda Samuel

(57) ABSTRACT

A method comprises receiving data, modulated according to a first modulation scheme, from a transmitter via an Ethernet link while the receiver is in a first mode. The first mode corresponds to a first power consumption level of the receiver. The method also includes receiving a sleep signal, and, in response, transitioning the receiver to a second mode. The second mode corresponds to a second power consumption level lower than the first power consumption level. The method also includes detecting an expiration of a predetermined time interval, and, in response, transitioning the receiver to a third mode. The third mode corresponds to a third power consumption level greater than the second power consumption level. The method also includes receiving a refresh signal modulated according to a different, second modulation scheme, synchronizing the receiver to the transmitter based on the refresh signal, and transitioning the receiver back to the second mode.

20 Claims, 6 Drawing Sheets

(56) References Cited

U.S. PATENT DOCUMENTS

| | | | |
|---|---|---|---|
| 6,252,904 | B1 | 6/2001 | Agazzi et al. |
| 6,253,345 | B1 | 6/2001 | Agazzi et al. |
| 6,397,053 | B1 | 5/2002 | Ghiazza |
| 6,473,607 | B1 | 10/2002 | Shohara et al. |
| 6,564,046 | B1 | 5/2003 | Chateau |
| 6,650,638 | B1 | 11/2003 | Walker et al. |
| 6,823,483 | B1 | 11/2004 | Creigh |
| 6,885,679 | B1 | 4/2005 | Cheong et al. |
| 6,947,483 | B2 | 9/2005 | Engwer |
| 6,956,847 | B2 | 10/2005 | Heston et al. |
| 7,081,838 | B2 | 7/2006 | Hoyer |
| 7,088,398 | B1 | 8/2006 | Wolf et al. |
| 7,127,653 | B1 | 10/2006 | Gorshe |
| 7,526,288 | B2 * | 4/2009 | Eom et al. ............... 455/435.1 |
| 2002/0067824 | A1 | 6/2002 | Wang |
| 2002/0129307 | A1 | 9/2002 | Walker et al. |
| 2003/0020803 | A1 | 1/2003 | Yang et al. |
| 2003/0095054 | A1 | 5/2003 | Ichino |
| 2003/0108092 | A1 * | 6/2003 | Gorecki et al. ............ 375/219 |
| 2004/0088590 | A1 * | 5/2004 | Lee et al. ................... 713/300 |
| 2004/0228364 | A1 | 11/2004 | Walker et al. |
| 2005/0105545 | A1 | 5/2005 | Thousand et al. |
| 2005/0157811 | A1 | 7/2005 | Bjerke et al. |
| 2007/0067497 | A1 | 3/2007 | Craft et al. |
| 2007/0101241 | A1 | 5/2007 | Hoyer |
| 2007/0242670 | A1 | 10/2007 | Simonson et al. |
| 2008/0225841 | A1 * | 9/2008 | Conway et al. ............ 370/389 |

OTHER PUBLICATIONS

George Zimmerman, "Deep Sleep Idle Concept for PHYs", IEEE P802.3az Energy Efficient Ethernet Task Force, Atlanta, GA, USA, Nov. 11, 2007, slides 3-13.

Oscar Agazzi, et al., "10Gb/s PMD Using PAM-5 Trellis Coded Modulation", Broadcom, IEEE 802.3, Albuquerque, New Mexico, Mar. 6-10, 2000, 38 pages.

Jamie E. Kardontchik, "4D Encoding in Level-One's Proposal for 1000BAS-T", Advanced Micro Devices, Aug. 21, 1997—Rev. B, pp. 1-24.

Erich F. Haratsch, et al., "A 1-Gb/s Joint Equalizer and Trellis Decoder for 1000BASE-T Gigabit Ethernet", IEEE Journal of Solid-State Circuits, vol. 36, No. 3, Mar. 2001, pp. 374-384.

Mehdi Hatamian, et al., "Design Considerations for Gigabit Ethernet 1000Base-T Twister Pair Transceivers", IEEE 1998 Custom Integrated Circuits Conference, pp. 335-342.

Gottfried Ungerboeck, "Trellis-Coded Modulation with Redundant Signal Sets", IEEE Communications Magazine, Feb. 1987, vol. 25, No. 2, pp. 5-21.

"Gigabit Ethernet Over Category 5", Copyright 2000-2001, Agilent Technologies, 12 pages.

M.P. Sellers, et al., "Stabilized Precoder for Indoor Radio Communications", IEEE Communications Letters, vol. 4, No. 10, Oct. 2000, pp. 315-317.

"Wirescope 350—Understanding ELFEXT", © 2000 Agilent Technologies, 2 pages.

David Crawford, "Adaptive Filters", © David Crawford 1996, pp. 1-5.

David A. Johns, et al., Integrated Circuits for Data Transmission Over Twister-Pair Channels, IEEE Journal of Solid-State Circuits, vol. 32, No. 3, Mar. 1997, pp. 398-406.

Prof. David Johns, University of Toronto, "Equalization", © D.A. Johns 1997, 29 pages.

Richard D. Wesel, et al. "Achievable Rates for Tomlinson-Harashima Precoding", IEEE Transactions on Information Theory, vol. 44, No. 2, Mar. 1998, pp. 824-831.

Wolfgang H. Gerstacker, et al., "Blind Equalization Techniques for xDSL Using Channel Coding and Precoding", submitted to AEU Int. J. Electr. Commun., May 1999, pp. 1-4.

Chip Fleming, "A Tutorial on Convolutional Coding with Viterbi Decoding", © 1999-2002, Spectrum Applications, pp. 1-6.

David Smalley, "Equalization Concepts: A Tutorial", Atlanta Regional Technology Center Texas Instruments, Oct. 1994, pp. 1-29.

Shao-Po Wu, et al., "FIR Filter Design via Spectral Factorization and Convex Optimization", to appear as Chapter 1 of Applied Computational Control, Signal and Communications, Biswa Datta Editor, Birkhausesr, 1977, pp. 1-33.

"28.5 Protocol Implementation Conformance Statement (PICS) Proforma for Clause 28, Physical Layer Link Signaling for 10 Mb/s, 100 Mb/s and 1000 Mb/s Auto-Negotiation on Twisted Pair", IEEE Std. 802.3, 1998 Edition, pp. 6-14 and 18-44.

M. Tomlinson, "New Automatic Equalizer Employing Modulo Arithmetic", Electronic Letters, vol. 7, 1971, pp. 138-139.

H. Harashima and M. Miyakawa, "Matched-Transmission Technique for Channels with Intersymbol Interference", IEEE Transactions on Communications, vol. COM-20, No. 4, Aug. 1972, pp. 774-780.

P. Kabal and S. Pasupathy, "Partial-Response Signaling", IEEE Transactions on Communications, vol. COM-23, No. 9, Sep. 1975, pp. 921-934.

R.F.H. Fischer, W.H. Gerstacker, and J.B. Huber, "Dynamic Limited Precoding, Shaping, and Blind Equalization for Fast Digital Transmission Over Twisted Pair Lines", IEEE Journal on Selected Areas in Communications, vol. 13, No. 9, Dec. 1995, pp. 1622-1633.

R.F.H. Fischer and J.B. Huber, "Comparison of Precoding Schemes for Digital Subscriber Lines", IEEE Transactions on Communications, vol. 45, No. 3, Mar. 1997, pp. 334-343.

Li, M., Wang, S., T. Tao, T. Kawasniewski, "FIR Filter Optimization as Pre-emphasis of High Speed Backplane Data Transmission", Electronics Letters, Jul. 8, 2004, vol. 40, No. 14, 2 pages.

"Producing a Counter EMF", http://www.tpub.com/neets/book2/5e.htm, 3 pages (date unknown).

A. Herkersdorf, et al., "A Scalable SDH/SONET Framer Architecture for DATACOM and TELCO Applications", IBM Research, Zurich Research Laboratory, Switzerland, 8 pages (date unknown).

Christopher T. DiMinico of Cable Design Technologies (CDT) Corporation, Massachusetts and Paul Kish of NORDX/CDT, Montreal, Canada, Development of Equal Leval Far-End Crosstalk (ELFEXT) and Return Loss Specifications for Gigabit Ethernet Operation on Category 5 Cooper Cabling, 10 pages (date unknown).

Pedro Silva, et al., "Precoder Circuit for Channels with Multipath Dispersion", Telecommunications Institute, Department of Electronics and Telecommunications Engineering, The University of Aveiro—University Campus, Portugal, 4 pages (date unknown).

Shao-Po Wu, et al., "FIR Filter Design via Semidefinite Programming and Spectral Factorization", Information Systems Laboratory, Stanford University, CA, 6 pages (date unknown).

J. Jezek, Institute of Information Theory and Automation, Prague, Czec Republic, et al., "New Algorithm for Spectral Factorization and its Practical Application", pp. 1-6 (date unknown).

"ADSL Tutorial", http://www.dslforum.org/aboutds1/ads 1 tutorial.html, pp. 1-3 (date unknown).

"Introduction to DSP", http://www.bores.com/courses/intro/filters/4 fir.htm, pp. 1-2 (date unknown).

"QAM_FR-QAM Demodulator with Variable Rate", DesignObjects™ by sci-worx, pp. 1-2 (date unknown).

"Description of Algorithms (Part 1)", http://pw1.netcom.com/Ichip.f/viterbi/algrthms.html. pp. 1-7 (date unknown).

"Continuous Time Aperiodic Signals" The Fourier Transform, http://ece.ucsd.edu/lcruz/ece.101/notes/nodes32html, pp. 1-2 (date unknown).

"Convolution", http://www.wam.umd.edu/Itoh/spectrum/Convolution.html, pp. 1-2 (date unknown).

"Convolution by DFT", http://www.gresilog.com/english/excommend/doc/convtd.htm, pp. 1-3 (date unknown).

Eyuboglu M V., "Flexible Precoding for V.Fast", Data Transmission-Advances in modem and ISDN Technology and Applications, 1992, UK, IEE, UK 1992, pp. 13-18.

* cited by examiner

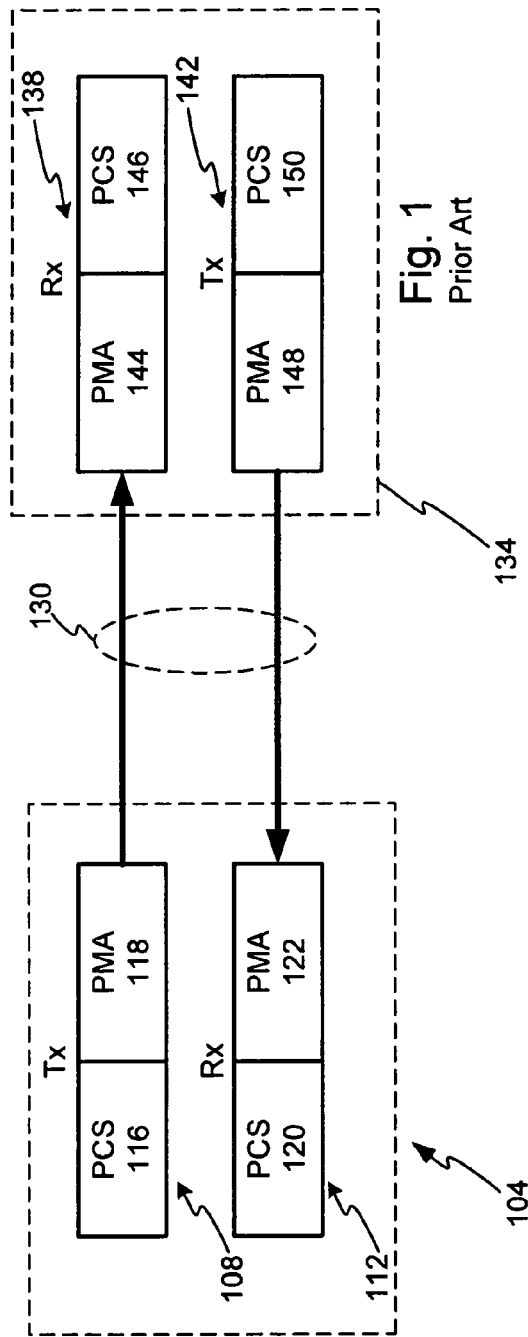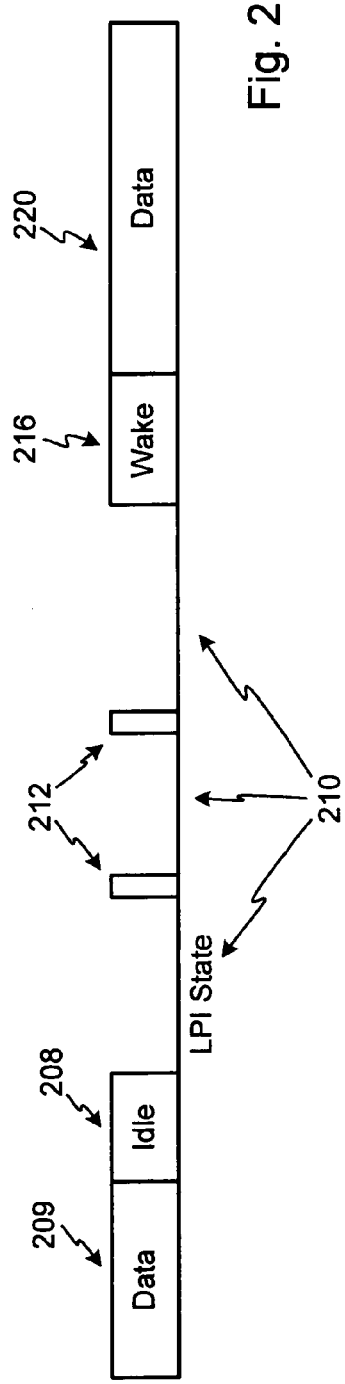

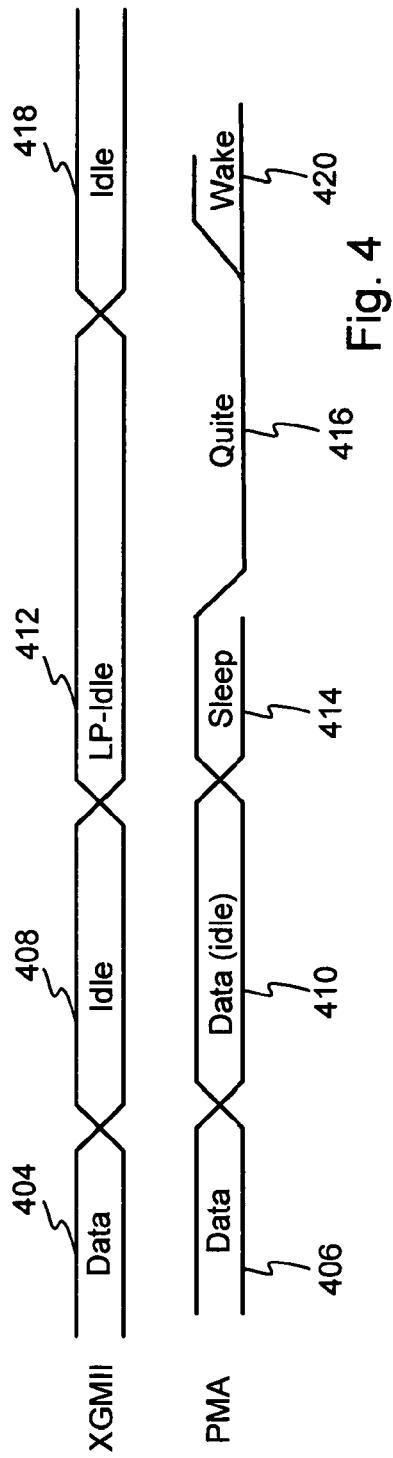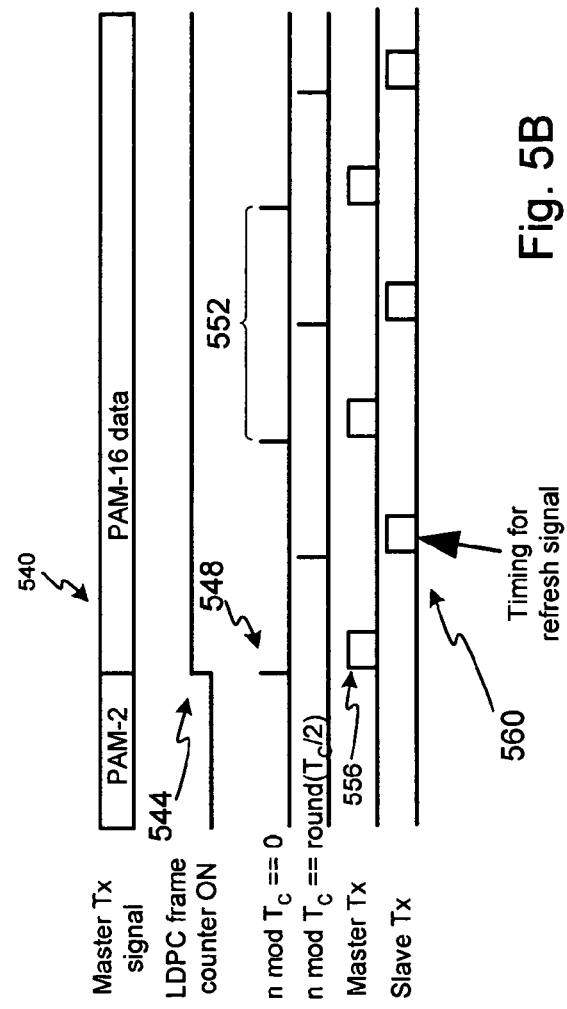

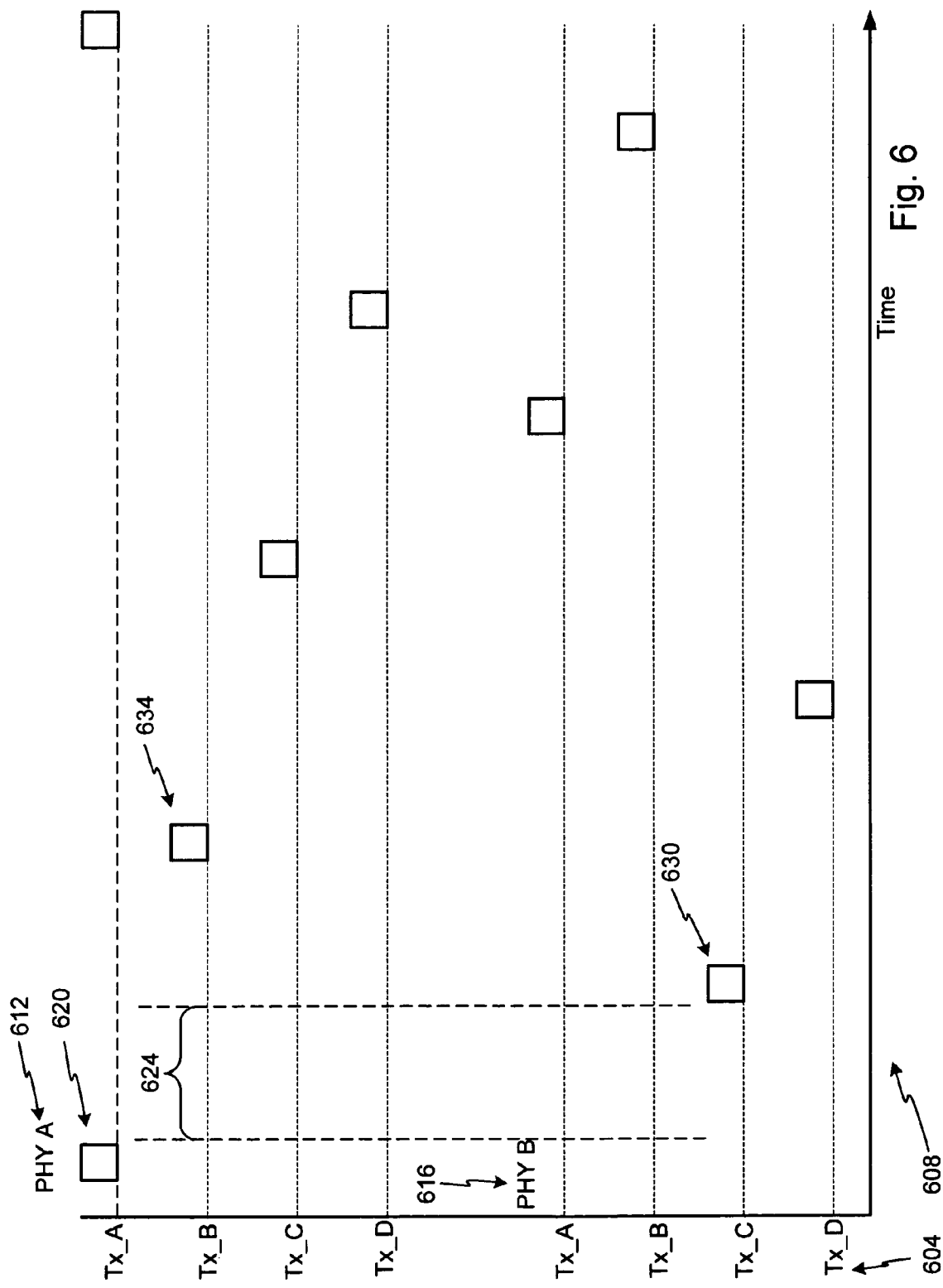

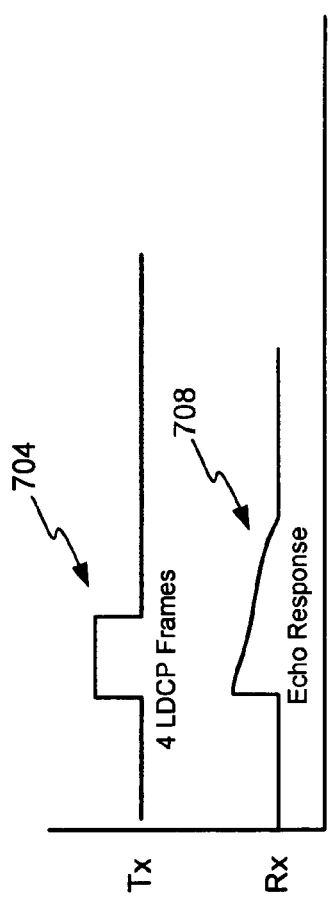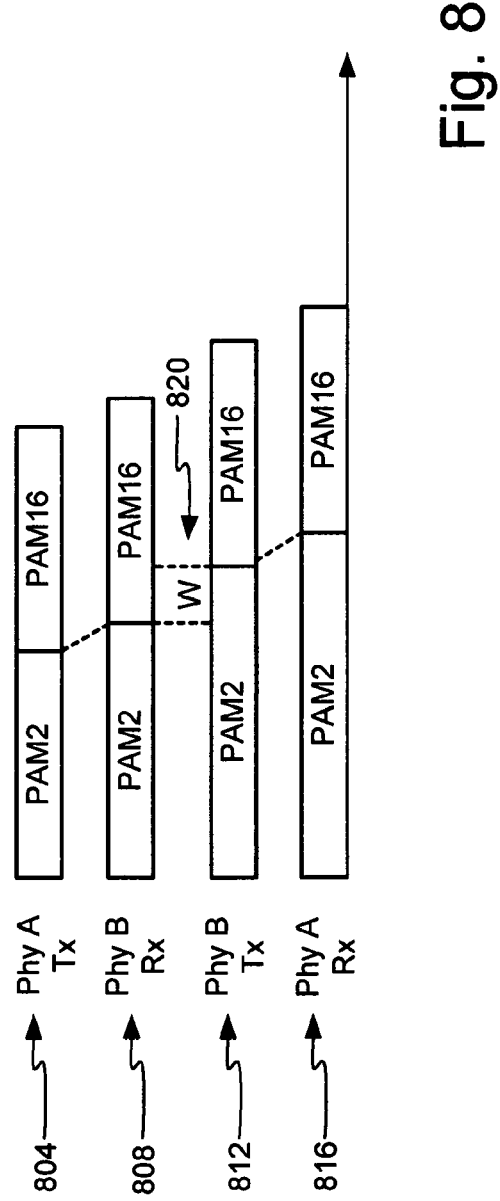

METHOD OF SYNCHRONIZATION FOR LOW POWER IDLE

PRIORITY CLAIM

The present application is a continuation of U.S. application Ser. No. 12/583,087, entitled "Method of Synchronization for Low Power Idle," filed on Aug. 11, 2009, now U.S. Pat. No. 8,270,389, which claims the benefit of U.S. Provisional Patent Application No. 61/188,717, entitled "Method of Synchronization for Low Power Idle" and filed on Aug. 11, 2008. Both of the above-referenced applications are hereby incorporated by reference herein in their entireties.

FIELD OF THE INVENTION

This invention relates to communication devices and systems, and in particular, to a method and apparatus for low power idle synchronization.

RELATED ART

Efforts are being made to develop a standard for energy efficiency in Ethernet. This enhancement will reduce power consumption in networks, such as for example Ethernet networks, when the link utilization is low. Low link utilization occurs when little or no data is being transmitted by the link.

As proposed in the prior art, power consumption is reduced in the following manner: When no data is ready to be transmitted by one side of the link, that side signals to the other side that is entering the lower power mode. Then, after a period of time the transceiver can power down its transmitting circuits. The receiver on the other side detects the sleep signal and can then power down its receiving circuits. Together this can save close to 50% of the power consumed maintaining the full-duplex link. If no data is ready to be transmitted in either direction then the transmitting and receiving circuits on both sides of the link can be powered down (this is known as symmetrical mode). When data is ready to be transmitted the relevant transmitter sends an alert signal that triggers the receiver to wake up to re-establish the link. This low power state is known as LPI (Low Power Idle) or EEE (Energy Efficient Ethernet) mode.

While this prior method of EEE mode reduces power consumption, it suffers from several drawbacks. One such drawback is that the master and slave may become out of sync during lower power mode. For example, 10GBASE-T devices, which operate under the Ethernet standard, contain a number of adaptive systems that maintain integrity during the low power mode to ensure that the transition back to full data mode is error free. This is particularly a concern for the timing recovery circuits which during loop timing mode the 'slave' transceiver recovers timing from the 'master'. During the quiet period the clocks can drift apart since the slave is unable to update its timing state to maintain synchronization with the master since there is no signal transmitted. As a result, this clock drift can inhibit operation of the receiver since the sampling time is no longer optimal and ISI (inter-symbol interference) increases, which degrades the link quality. This reduces the SNR (signal to noise ratio) at the receiver, and can increase the rate at which incorrect decisions are made at the receiver's slicer or decision device as well as increasing the BER (bit error rate) in the device. In turn this reduces the accuracy of the adaptive filters used to cancel the various kinds of interference. This causes errors on the link and in the worst case it can cause the link to retrain, meaning that no data can be transferred for several seconds.

The innovation disclosed herein overcomes these drawbacks and provides additional benefits.

SUMMARY

In one embodiment, a method comprises receiving, at a receiver, data from a transmitter. The data is received via an Ethernet link, is modulated according to a first modulation scheme, and is received while the receiver is in a first mode. The first mode corresponds to a first power consumption level of the receiver. The method also includes, after receiving the data, receiving, at the receiver, a sleep signal from the transmitter, and, in response to receiving the sleep signal, transitioning the receiver to a second mode. The second mode corresponds to a second power consumption level of the receiver that is lower than the first power consumption level. The method also includes, after transitioning to the second mode, detecting, at the receiver, an expiration of a predetermined time interval, and, in response to detecting the expiration of the predetermined time interval, transitioning the receiver to a third mode. The third mode corresponds to a third power consumption level of the receiver that is greater than the second power consumption level. The method also includes, after transitioning to the third mode, receiving, at the receiver, a refresh signal from the transmitter. The refresh signal is modulated according to a second modulation scheme different than the first modulation scheme. The method also includes synchronizing the receiver to the transmitter based on the refresh signal, and, after synchronizing the receiver to the transmitter, transitioning the receiver back to the second mode.

In another embodiment, a device comprises a receiver configured to receive, from a transmitter coupled to the receiver via an Ethernet link, data while the receiver is in a first mode. The first mode corresponds to a first power consumption level of the receiver. The data is modulated according to a first modulation scheme. The receiver is also configured to, after receiving the data, receive a sleep signal from the transmitter, and, in response to receiving the sleep signal, transition to a second mode. The second mode corresponds to a second power consumption level of the receiver that is lower than the first power consumption level. The receiver is also configured to, after transitioning to the second mode, detect an expiration of a predetermined time interval, and, in response to detecting the expiration of the predetermined time interval, transition to a third mode. The third mode corresponds to a third power consumption level of the receiver that is greater than the second power consumption level. The receiver is also configured to, after transitioning to the third mode, receive a refresh signal from the transmitter. The refresh signal is modulated according to a second modulation scheme different than the first modulation scheme. The receiver is also configured to synchronize to the transmitter based on the refresh signal, and, after receiving the refresh signal, transition back to the second mode.

In another embodiment, a method comprises generating, at a transmitter, data modulated according to a first modulation scheme, and transmitting, via the Ethernet link, the data to a receiver while the transmitter is in a first mode. The first mode corresponds to a first power consumption level of the transmitter. The method also includes, after transmitting the data to the receiver, transitioning the transmitter to a second mode. The second mode corresponds to a second power consumption level of the transmitter that is lower than the first power consumption level. The method also includes, after transitioning the transmitter to the second mode, detecting, at the transmitter, an expiration of a predetermined time interval, and, in response to detecting the expiration of the predetermined time interval, transitioning the transmitter to a third mode. The third mode corresponds to a third power consumption level of the transmitter that is greater than the second power consumption level. The method also includes generating, at the transmitter, a refresh signal that (i) is to be used by the receiver to synchronize to the transmitter, and (ii) is modulated according to a second modulation scheme different than the first modulation scheme, and, after transitioning the transmitter to the third mode, transmitting, from the transmitter, the refresh signal to the receiver via the Ethernet link. The method also includes, after transmitting the refresh signal to the receiver, transitioning the transmitter back to the second mode.

In another embodiment, a device comprises a transmitter configured to generate data modulated according to a first modulation scheme, and transmit, via an Ethernet link, the data to a receiver while the transmitter is in a first mode. The first mode corresponds to a first power consumption level of the transmitter. The transmitter is also configured to, after transmitting the data to the receiver, transition to a second mode. The second mode corresponds to a second power consumption level of the transmitter that is lower than the first power consumption level. The transmitter is also configured to, after transitioning to the second mode, detect an expiration of a predetermined time interval, and, in response to detecting the expiration of the predetermined time interval, transition to a third mode. The third mode corresponds to a third power consumption level of the transmitter that is greater than the second power consumption level. The transmitter is also configured to generate a refresh signal that (i) is to be used by the receiver to synchronize to the transmitter, and (ii) is modulated according to a second modulation scheme different than the first modulation scheme, and, after transitioning to the third mode, transmit the refresh signal to the receiver via the Ethernet link. The transmitter is also configured to, after transmitting the refresh signal to the receiver, transition back to the second mode.

Other systems, methods, features and advantages of the invention will be or will become apparent to one of ordinary skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 1 illustrates an example environment of use having two communication transceivers.

FIG. 2 illustrates an example timing diagram for transition to idle of one example embodiment.

FIG. 4 illustrates an exemplary timing diagram of transition between the XGMII and the PMA modules.

FIG. 5B illustrates timing diagram of a master slave refresh period assignment after PAM2 training.

FIG. 6 illustrates an exemplary timing diagram for a 4 channel communication system configured for duplex operation.

FIG. 7 illustrates an echo response resulting from an exemplary refresh signal.

FIG. 8 illustrates a timing diagram between PHY A transceiver and PHY B transceiver relative to a PAM16 transition.

DETAILED DESCRIPTION

Figure 3:
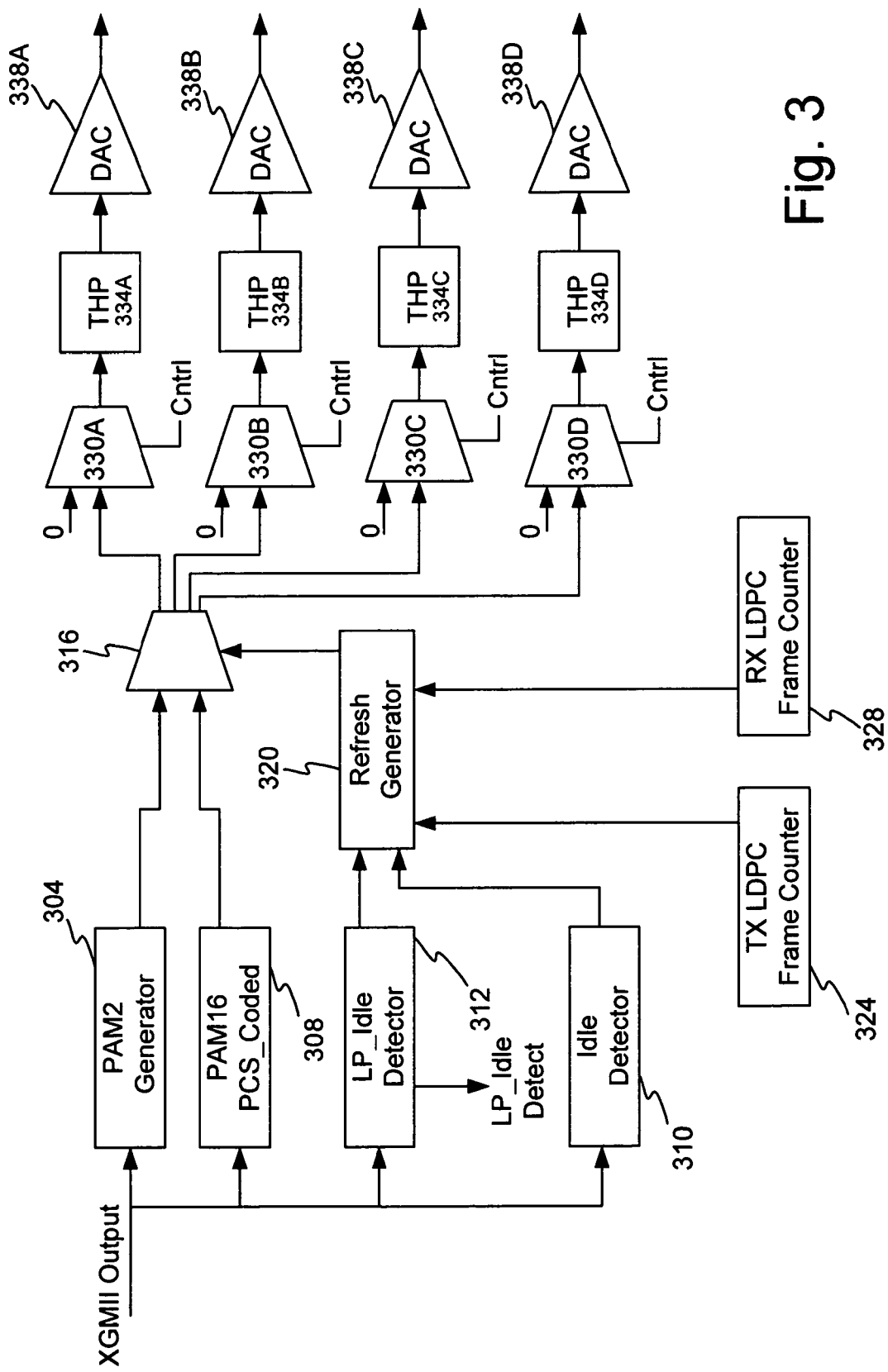
FIG. 3 illustrates an example embodiment of a low power idle (LPI) system configured to establish timing for refresh signals and present refresh signals to the channels.

FIG. 1 illustrates an example environment of use between two communication transceivers. This is but one possible environment of use and as such, it is contemplated that other environments of use may also adopt the teachings disclosed herein. As shown, a first transceiver 104 includes a transmitter 108 and a receiver 112. The transmitter 108 comprises a PCS 116 and a PMA 118. The PCS (physical coding sublayer) encodes the data from an upper layer, such as a MAC layer, and adds framing information and redundancy to aid in error detection and correction. The operations performed by the PCS 116 facilitate frame recovery and error correction decoding at an opposing receiver.

The output of the PCS 116 feeds into the PMA (physical medium attachment) 118. The PMA 118 is responsible for converting the digital data to a format and signal type suitable for transmission over a communication channel or cable 130. A THP (Tomlinson-Harashima precoder) (not shown) may be located within the PMA 118. An analog front end (AFE) (not shown) may be located between the PMA 118 and the channel 130.

This example embodiment also includes the receiver 112 having a PMA 122 and a PCS 120. Likewise, the opposing transceiver 134 includes a receiver 138 and transmitter 142, each having a PMA 144, 148 and PCS 146, 150 as shown. Operation for each element is as described above. It is contemplated that this example environment may be embodied in an Ethernet communication system communicating over 4 twisted pair conductors. One of ordinary skill in the art is versed on the environment and apparatus of an Ethernet based network communication device and hence this environment is not discussed in detail.

FIG. 2 illustrates an example timing diagram of one example embodiment. In contrast to the prior art that would enter an indefinite sleep state until awaken by an activate signal, the method and apparatus disclosed herein established a predetermined timing protocol to establish periods during which a refresh signal is generated and sent to a corresponding timed and recently activated receiver.

As shown in FIG. 2, during a period 209 the communication system is engaged in active data exchange. During a period 208 the communication system enters an idle mode 208 wherein the communication system continues to transmit over the channel, but does so with packets and frames containing idle control data or other information to maintain synchronization of the communication devices. After a period of idle 208, the transmitter enters into LPI (low power idle) state 210. This period comprises a period when the transmitter and receiver are synchronously powered down to reduce power consumption.

It is contemplated that powering down as many components and subsystems as possible will occur to increase the amount of realized power consumption. In one embodiment, during the LPI state, one or more of the following components are powered down: echo cancellers, next (near end crosstalk) cancellers, fext (far end cross talk) cancellers, equalizers, timing recovery, DACs (digital to analog converters), ADCs (analog to digital converters), AFEs, and PGAs.

After a predetermined period of time or predetermined counter value the transmitter and corresponding receiver awake for a refresh period 212. During the refresh period 212 the receiver awakes just prior to the refresh signal when the transmitter transmits, for a short period, idle or other type information sufficient for the transmitter to maintain synchronization with the receiver and for the receiver to adapt its filters, equalizers and clock to the transmitter. Over time, the clock, which synchronizes the transmitter to the receiver and guides slice and decision operations, can drift if synchronization does not occur. This results in the transmitter's master clock being unsynchronized from the receiver, which results in decoding and slicing errors. After a refresh period 212, the transmitter and receiver return to LPI mode 210 until the next predetermined refresh period.

The refresh signals may comprise any type data to achieve clock synchronization and filter/equalizer adaptation. In one embodiment the refresh signals comprises idle packets. In one embodiment the refresh signal is a predefined pseudo-random PAM2 sequence. Refresh signals may be PAM2 coded, PAM16 coded, or any other coding scheme.

Upon the transmitter receiving data to be transmitted from upper layers, such as the MAC, the transmitter sends an alert/wake sequence. The alert sequence is detected by a simple low-power circuit and wakes the rest of the receiver from the low power mode. The wake sequence 216 instructs the receiver to return to active data mode. After wake code is received and processed, the system returns to active data communication in period 220. Through the use of periodic refresh signals at predetermined refresh periods or times, clock synchronization is maintained and the filters/equalizers are likewise adapted.

Therefore, to limit the loss due to the timing offset, while in LPI mode the transmitter and receiver wake up periodically and data is transferred between them, with the aim to keep the coefficients in adaptive filters and timing loops up to date.

The EEE mode can operate asymmetrically (one side of the link is in LPI/EEE quiet/refresh cycling, the other is in full data mode) or symmetrically (both sides of the link are in LPI/EEE quiet refresh cycling).

In symmetrical mode greater power savings can be attained since both the transmitting and receiving parts of the transceiver can be powered down for relatively long periods of time. To maximize power savings the refresh signals for the master-transmitted signal and the slave-transmitted signal are synchronized so that they do not overlap. This alignment minimizes/eliminates overlap between the near and far-end signals after they have been dispersed by the channel response. This allows the adaptation of echo/next (near end crosstalk) filters and equalization/FEXT (far end crosstalk) filters to be separated which provides the greatest opportunity for power savings. Achieving this alignment is important to achieve maximum power savings.

Overlap is unwanted because when a refresh signal is set from the transmitter, it creates an echo which is reflected back into the system. To cancel this echo would require powering and operation of the echo canceller, which consumes power. Since one of the goals of the present invention is to reduce power consumption, it is preferred to minimize operation of the echo canceller. By avoiding or preventing overlap, a refresh signal will not be received at a transmitting transceiver, thereby avoiding need for the echo canceller.

FIG. 3 illustrates an example embodiment of a low power idle (LPI) system configured to establish timing for refresh signals and present refresh signals to the channels. This is but one possible example embodiment and it is contemplated that one of ordinary skill in the art may arrive at different embodiments without departing from the scope of the claims that follow. This example embodiment is shown in a four channel embodiment typical of network based Ethernet operating over twisted pair copper.

In this embodiment an XGMII presents a signal to a PAM2 generator 304, a PAM16 PCS_coded signal generator 308, and an LP_Idle Detector 312 and an idle detector 310. The PAM2 LFCR generator 304 generates PAM2 signals for use during training and during refresh. In the 10Gbit standard, training occurs within a 2 second time period utilizing PAM2 coded training sequences. Training includes clock synchronization, and establishment of filter, precoder, and equalizer coefficients. After training, the system transitions to PAM16 coding at a 10 gigabit rate. It is contemplated that during refresh periods that PAM2 signals, PAM16 signals, or any other format may be utilized for synchronization and adaptation.

The PAM16 PCS coded signal generator 308 processes the input from the XGMII to generate PAM16 coded frames. It is contemplated that the data may be encoded using a technique known as DSQ (double square constellation). PAM16 coding is understood by one of ordinary skill in the art of 10 Gigabit Ethernet and is not discussed in detail herein. The XGMII output is also presented to the LP_Idle (LPI) detector 312.

The idle detector 310 has an output which connects to the refresh generator 320. The idle detector 310 detects idles, such as codes or frames, in the XGMII data that follow LP_idles. At this transition the PHY will terminate transmit lower power mode and begin to send the alert sequence followed by the wake signaling. The idle detector 312 monitors for the idle signal from the XGMII when the XGMII enters the normal idle state. The output from the idle detector 312 is utilized to detect a transition from the lower power mode. This signals the transmitter that it should transition to the normal mode of operation by sending the alert and wake signals, followed by normal data.

The output of the PAM2 generator 304 and the PAM16 coded signal generator 308 connect to a multiplexer 316. The multiplexer 316 also received a control signal from a refresh generator 320 which selectively controls which input signal is output from the multiplexer 316. The multiplexer 316 comprise any device capable of selectively outputting one of multiple inputs signals on its outputs. Although shown as a multiplexer, it is contemplated that other devices, such as switches, control logic, and the like, may be utilized instead. Through control of the multiplexer 316, either the PAM2 signal or the PAM16 signal may be output to downstream portions of the transmitter shown in FIG. 3.

An LP_idle detector 312 provides an input to the refresh generator 320 to assist in the refresh generator providing the control signal to the multiplexer 316. The LP_idle and idle codeword detectors are used to time transitions to and from the lower power mode using sleep and wake signals.

Also input to the refresh generator 320 is a transmit LDPC frame counter 324 and a receiver LDPC frame counter 328. In one embodiment, these counters comprise 9 bit counters which cycle at 512 count value. The frame counters 324, 328 are activated at the start of the transition from PAM2 to PAM16 or synchronized with another counter or event. These frame counters 324, 328 maintain a continual count and these counts are utilized by the system of FIG. 3 for timing the refresh signal exchange. In one embodiment, the counters generate a count and periodically at fixed predetermined times values during the counter value sequence, refresh periods are predetermined so that refresh signals are transmitted and received. To increase power savings, while also maintaining synchronization and adaptation, because refresh signals are periodically sent, based on predetermined times or counter values so that the receiver may remain in sleep mode until the predetermined refresh period and does not need to monitor the channel. FIG. 6 discussed this in greater detail.

The output of the multiplexer 316 is presented to the channels A-D as shown and in particular to a multiplexer 330A-330D associated with each channel as shown. The alternative inputs to the multiplexer 330 are zero inputs that are also used to reset the delay line within the THP. The multiplexer may also be used to control AFE/DAC for power savings. A channel specific control input is also presented to the multiplexers 330 to control which input is presented on the multiplexer output. It is contemplated that during LPI (low power idle) mode the output from the multiplexers 330 may comprise a zero output, or either of the PAM16 signal or a PAM2 signal. It is also contemplated that any channel A-D may be independently controlled as to when its predetermined time period to enter LPI mode and conduct a refresh operation will occur. In one embodiment this is controlled by the LDPC counter values based on a predetermined timing or scheduling scheme, but in other embodiments, other factors or means may control the timing of the refresh periods.

The output of the multiplexers 330 feed into Tomlinson Harashima precoders 334A-334D. In other embodiments, different precode operations may occur, or precoding may be omitted. The output of the precoders 334 is presented to DA converters 338A-338D which modify the format of the outgoing signals to an analog format suitable for processing by an analog front end and eventual transmission over a channel.

In operation, the XGMII outputs data or control information to the PAM2 signal generator 304, the PAM16 coded signal generator 308, and the LP_Idle detector 312. During training the PAM2 generator generates a PAM2 coded signal which is output to the multiplexer 316 and routed through the transmitter to the channel. Training occurs as is understood in the art. At the end of training, the system transitions from PAM2 coding to PAM16 coding to achieve a higher effective data transmit rate. At this transition the LDPC counters are initiated. These counters run continually during operation of the communication device and are synchronized with system operation.

After a period of inactivity, the XGMII may send an idle control code which is control code that is PAM16 coded, just like data, to maintain the communication link. After a period of idle from the XGMII, the communication system may transition into LPI mode. This transition to LPI (LPI) mode may be the result of commands from upper layers or from the XGMII itself, or one or more idle frame counters. In one embodiment, uppers layers generate and output a special control character defined as a low power idle character. Upon receipt of this LPI character, entry into LPI mode occurs.

To initiate LPI mode, the operation monitors for a code or other signaling from the XGMII. In one embodiment, each channel, and each master and slave associated with a channel, is assigned a predetermined LDPC frame counter value at which it will send and/or receive refresh signals. In one embodiment, a transmitter associated with a channel may enter sleep mode at any time after entry to idle, but refresh periods are set by the LDPC frame counter values.

After entry into LPI mode, the multiplexer 330 associated with the channel entering LPI mode is controlled to output a zero output. One or more control signals from a controller, processor, or control logic may be configured to output a power down signal to these elements. In addition, other aspects of the channel may be shut down or enter a low power mode to reduce power consumption. This includes, but is not limited to the THP 334, the DAC 338, PMA, PCS, an analog front end including amplifiers and drivers, and the PAM16 and PAM2 encoders. Likewise, the receiver components may also be shut down or enter low power mode to reduce energy consumption. These components include but are not limited to equalizers, echo and NEXT cancellers, FEXT cancellers, ADC, PGA, LCPC decoders, or any other device. By shutting one or more of these devices down or entering low power mode, power savings is realized.

During LPI mode, the system monitors the LDPC frame counter for a count value associated with and designating a predetermined refresh period for that channel. Upon occurrence of the predetermined LDPC frame counter value, the transmitter and corresponding remote receiver awake for a refresh period. At this time, the refresh generator 320 provides a control signal to output from the multiplexer 316 either of the PAM2 or PAM16 signal, which are processed in the normal course to achieve clock synchronization and adaptation of the equalizers and filters. It is contemplated that the remote receiver may awake slightly before the refresh signal so that is prepared for the incoming refresh signal. Then, a refresh signal is sent from the transmitter to the receiver. The refresh signal is processed by the receiver to update the clock synchronization and to adapt the equalizers and filters.

After the refresh signal is sent and synchronization and adaptation occurs, the system re-enters sleep mode to reduce power consumption. To re-enter sleep mode the multiplexer 330 is controlled to output zero values and the desired components are powered down or enter low power mode.

When the upper layers have data to transmit, the system must exit LPI mode. To exit LPI mode the XGMII provides data to the PAM16 generator 308 and the LP_Idle detector 312. The data request is detected and a wake signal is sent to the corresponding receiver. This wake signal restores the receiver and transmitter to active data mode and data communication occurs.

It is contemplated that in one embodiment a portion of the receiver does not sleep, so that it can detect the alert sequence which signals that the wake signal will follow. In such an embodiment, when the transmitter sees XGMII signaling that indicates IDLE signals, it begins to move from the low power mode to the normal operational mode. In this embodiment, the first step is to transmit an alert sequence, which is a predefined sequence of non-precoded PAM2 symbols. The alert sequence is followed by the wake sequence which is PAM16/DSQ data (encoded IDLE codegroups). As such, in this embodiment a small part of the receiver that detects the PAM2 sequence is always on during the lower power mode and when it detects the PAM2 alert sequence it turns on the rest of the receiver in time to receive all or part of a wake sequence and the receiver is then ready to receive normal data immediately after the wake sequence. In an alternative embodiment, the receiver remains in sleep mode until a refresh period, at which time it listens for an alert sequence. The transmitter would likewise only send an alert sequence during the refresh period. If refresh periods are not spaced too great a time period apart, this delay would not be noticeable to a user.

FIG. 4 illustrates an exemplary timing diagram of the transition between the XGMII and the PMA modules. As shown in FIG. 4, an output of the XGMII comprises data 404 and the corresponding output from the PMA output is coded data. When the XGMII transitions to idle (no upper layer data to transmit), the PMA continues to output data, but is designated as idle data 410 by control codes.

After a period of idle 408 by the XGMII, the XGMII transitions to low power idle 412. The detection of the low power idle 412 causes the PMA to output a sleep signal 414, and the transition to quiet period 416. It is contemplated that during this quiet period 416, the transmitter and opposing receiver may enter LPI state to reduce power consumption and realize power savings.

When the XGMII has upper layer data to transmit, it may output either idle or data information 418. In one embodiment it first sends an easy to detect and decode PAM2 signal, which may or may not be precoded. Then idle signals are encoded in PAM16, which comprise the wake signal, followed by data.

FIG. 5B illustrates timing diagram of a master slave pair post PAM2 training. In symmetrical mode LPI/EEE for 10GBASE-T, it is possible to synchronize the master and slave transceivers so that the master's refresh-quiet cycle is half a cycle away from the slave's refresh-quiet cycle. This provides numerous benefits. One such benefit is that it prevents overlap of the refresh signals. In addition, increases power reduction while maintaining clock synchronization.

Sleep mode is signaled by the transceiver sending LP_IDLE codewords to the link partner. The LP_IDLE codewords are detected at the end of the link partner's receive path, after signal processing and error correction.

Figure 5A:
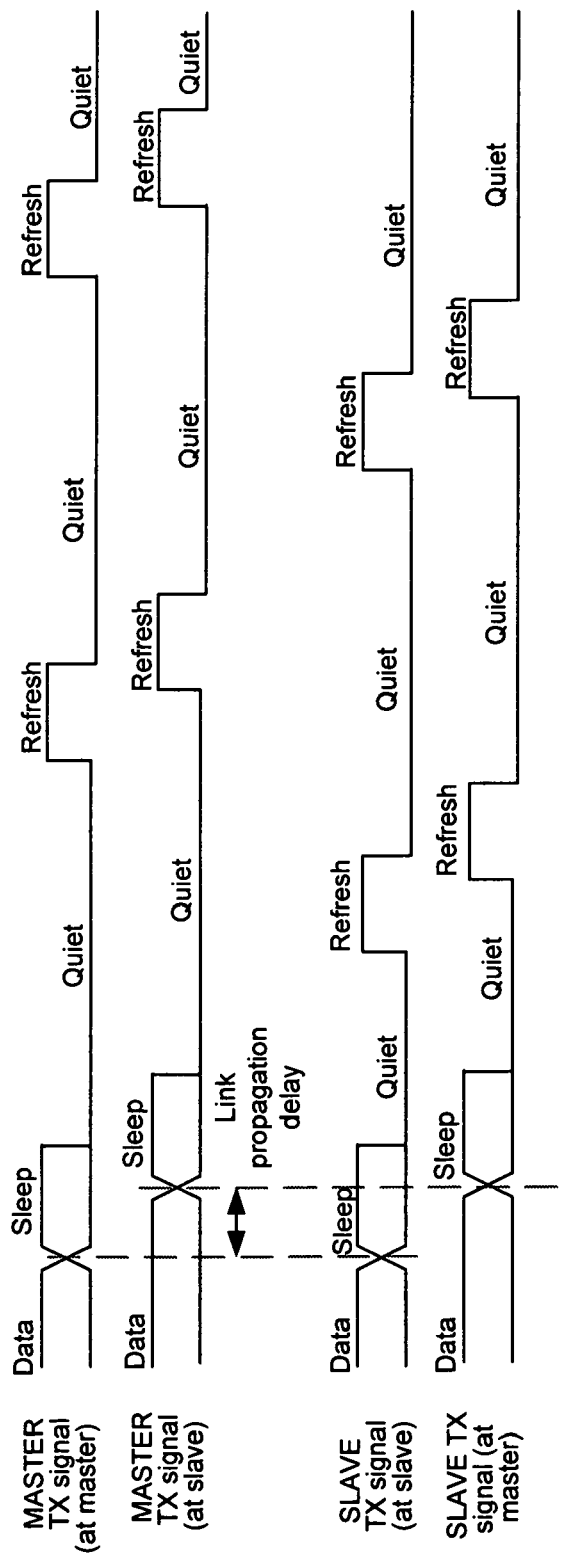
FIG. 5A illustrates how XGMII code words are converted to signaling on the wire.

One major impediment to achieving the optimal symmetric refresh-quiet synchronization is that if both transceivers try to enter the low power idle around the same time. For example, the alignment must be established by the link partners with little training time and no prior knowledge of the link partner timing. Neither side knows when the other will decide to enter sleep. Thus, it is possible that the transceivers enter sleep simultaneously, in which case some mechanism is required to determine which link partner should be used as the refresh reference. This is shown in FIG. 5A. This is further complicated by the unknown latencies of the link itself as well as the transmit path and the receive path (which are likely to vary by implementation), since the second transceiver does not detect the sleep signal exactly when the first transceiver decides to transmit it.

Resolving this alignment is difficult without a complex handshaking and synchronization scheme using the sleep signal. To date, no solutions exist to this problem. The requirements for 10GBASE-T EEE are different to the requirements for previous generations of Ethernet.

A solution as disclosed herein is to use symmetrical sleep signaling so that the slave waits longer than the master before transitioning into the refresh-quiet cycle. While this is one possible solution, this solution would add complexity and extreme care must be taken with boundary conditions.

The requirements for 10GBASE-T are higher than for other Ethernet standards since the data rate is much higher and there is the receivers are more complex. A similar refresh-quiet signaling is not used for 1GBASE-T/100BASE-TX PHYs.

Another solution to the synchronization problem uses a reference available to both sides, instead of requiring that the last transceiver to transition adjust its quiet refresh cycle with respect to the link partner. The following disclosed one possible embodiment of a solution based on this principle. In other embodiments variations to this solution will be contemplated by one of ordinary skill in the art.

10GBASE-T transceivers have about 2 seconds to train and exchange information before they transition to the full data mode. During this time the transceivers train using a PAM-2 constellation. Once the PHYs enter data mode the transceivers send each other data using a PAM-16 constellation. The data is contained in LDPC frames, which last for 256 symbols on each pair.

During PAM-2 training the PAM-2 signal on pair A inverts at 256 symbol intervals, at the LDPC boundary. The signal also contains one 16-octet infofield every 16384 PAM-2 symbols. The infofield includes a countdown field that expires when the transmitting PHY transitions from PAM-2 training data to PAM-16 data mode. Together these values can be used by the slave to identify the exact 800 MHz symbol when the master transitions to data mode.

FIG. 5B illustrates timing diagram of a master slave refresh period assignment after PAM2 training. In this example embodiment, the slave uses the master's infofield countdown to start a local counter at the start of the master's PAM-16 data-mode 540. This countdown may start at exactly the start of the master's PAM-16 data-mode or at another time referenced from the start of the master's PAM-16 data-mode. The counter increments at the start of LDPC frame 544 and provides both sides with a timing reference with respect to the master (the counters may be offset by the latency of the link, which is unknown). The time for the refresh signal is known as $T_r$ 548. The quiet period is known as $T_q$ 552. The complete cycle time is known as $T_C$. Each of these periods is an integer multiple of the LDPC frame time $T_f$. Although link latency is not known, it is defined by a maximum value or can be measured, so latency can be accommodated in this LPI system by accounting for the maximum potential or actual latency.

The master sends a refresh 556 timed to $k.T_C$ at the boundary of a refresh-quiet cycle timed with respect to the master's transition to data-mode. The slave knows exactly when the refresh signal will appear at its receiver. Each refresh is transmitted on a fixed pair derived using simple modulo logic. For example, in one embodiment, the refresh on pair A is transmitted when the refresh active signal is high and the LDPC frame counter modulo $4T_C$ is less than $T_C$, the refresh on pair B is transmitted when the refresh active signal is high and the LDPC frame counter modulo $4T_C$ is between $T_C$ and $2T_C$. The slave is able to derive the timing of the refreshes it receives through similar modulo logic based on the receive LDPC frame counter.

In this embodiment, the slave sends a refresh 560 timed to $k.T_C+0.5\times T_f$, exactly halfway into the master's refresh-quiet cycle, timed with respect to the master's transition to data-mode at the slave. The signal is guaranteed not to overlap with the master's refresh signal since the latency, in this embodiment, of the link is bounded to 570 ns (802.3 an standard paragraph 55.7.2.5). It is contemplated that $T_q$ may be much greater than 570 ns. The master is able to derive the timing of the refreshes it receives through similar modulo logic based on the receive LDPC frame counter.

In this scheme the master can detect the first slave refresh signal to recover the exact alignment (since the latency of the link is an unknown parameter).

It is also contemplated that another solution is for the slave to extend the LPI sleep signal (LP_IDLE) to the next refresh boundary to give an absolute reference to the master, but this could be a complete quiet time away, which reduces power savings and as such may not be as desirable.

It is contemplated that the LPI system may operate in symmetric or asymmetric modes. Power savings may be maximized when either transceiver in a transceiver pair may independently enter LPI mode. For example, during a network operation requiring downloading of data from a remote server, one transceiver may be continually transmitting the data to the requesting transmitter, but the requesting transceiver may only periodically transmit acknowledgment signals. During these quiet periods between the transmission of the acknowledgement signals, the requesting transceiver may enter LPI mode. It is contemplated that the time from idle to entry into LPI may be short, thereby providing for power savings since only a short period time would pass in idle mode before LPI state occurs.

FIG. 6 illustrates an exemplary timing diagram for a 4 channel communication system configured for duplex operation. This figure illustrates an exemplary timing and spacing scheme for refresh signals on each bi-directional pair. The vertical axis 604 represents each pair's transmitter for PHY A 612 and PHY B 616. The horizontal axis 608 represents time. It should be noted that this is but one example sequencing of refresh signals and in other embodiments other sequencing or ordering for refresh signals may be arrived at by one of ordinary skill in the art.

In this example embodiment a refresh signal 620 is sent during a first refresh period on channel A from PHY A 612. After a time period or counter value delay 624, a refresh signal 630 is sent on channel C from PHY B 616. It is contemplated that the time or counter value at which each transmitter transmits it refresh is set based on the LDPC frame counter, which start at the transition to PAM16.

Thereafter, a refresh signal 634 is sent from transmitter B associated with PHY A 612. Other refresh signals are sent as shown with the predetermined timing and spacing as shown in FIG. 6. During periods when a refresh signal is not being sent, the transmitter is in sleep mode and not transmitting signals as shown. A receiver corresponding to the transmitter is also in sleep mode and only wakes at predetermined and known times to receive and process the refresh signal.

The spacing between refresh signals shown in FIG. 6 may be selected based on the particular clock synchronization requirements. In one embodiment the refresh counter is set to a 512 LDPC frame count. In the network Ethernet embodiment having 8 transmitters total between a master and slave transceiver set, equate to a refresh period every 64 LDPC frames. In one embodiment the refresh comprises 4 LDPC frames in duration and the subsequent quiet or sleep period is 124 LDPC frames. This equate to a total of 128 frames per total cycle. In other embodiments other refresh signal spacing may be selected. In one embodiment, the timing of each refresh is set by the LDPC frame counter which is triggered by the transition to PAM 16.

Spacing between refreshes provides numerous advantages. One such advantage is that a clock update from one periodic refresh signal may be utilized to update the clock for all channels at a PHY. A timing recovery loop defines when or how often a system needs to update or refresh its clock synchronization. In this embodiment every refresh signal sent out and received is shared between pairs to refresh the clock synchronization for all channels A-D on a PHY 612, 616. However, the adaptive filters and equalizers do not require updating as often as the clock and can thus be updated with each refresh signal, such as once every 512 LDPC frames, which is the cycle period in this embodiment for the refresh signal. Other embodiments may adapt at a different cycle timing.

Another advantage with the timing and spacing scheme which does not overlap refresh signals is that a receiver in the same transceiver as a transmitter sending a refresh signal may remain in sleep mode because it does not have to process an incoming refresh signal. By preventing overlap of refresh signal periods, the echo canceller may remain off, which in turn increases power savings. As is understood, echo cancellers consume a significant amount of power and by keeping the echo canceller circuitry off, power savings is maximized.

Another advantage is best understood in relation to FIG. 7, which illustrates an echo response resulting from an exemplary refresh signal. In this example plot the refresh signal is a fixed number of $T_r$ frames. In one embodiment, this fixed number of $T_r$ frames comprises 4 LDPC frames. By maintaining sufficient spacing between a refresh signal 704 and subsequent refresh signals on other channels, the echo response 708 from the refresh signal 704 does not affect other refresh periods. As shown, before another refresh signal on another channel occurs, the echo will have dissipated so that it does not interfere with the other channels refresh period.

Another advantage over the prior art is that this method substantially reduces the complexity of sleep signaling and reduces the risk that different implementations of the LPI mode do not interoperate. For example, alternative solutions require complex handshaking for the sleep signal, which increases power and design complexity and interoperability risk. Other solutions are likely to have corner conditions that are difficult to test and debug, particularly when the latency of the link, the transmit path, and the receive path vary.

Furthermore, other solutions might require a longer handshaking period that would reduce the energy efficiency of the low power idle mode. Since the timing of the master refresh signal is known precisely, the implementer can chose to power down circuits for a longer period of time than if the timing were uncertain, which results in power savings.

FIG. 8 illustrates a timing diagram between PHY A transceiver and PHY B transceiver. This diagram is provided for purposes of understanding and is not to scale and does not depict accurate timing routines for an actual system. One potential problem with the prior art is that when a PHY A transmitter 804 switches to PAM16 coding after training, the corresponding PHY B receiver 806 likewise transitions to PAM16. However, there may be a period W 820 before the PHY B transmitter 812 transitions from PAM2 coding to PAM16 coding. This period W 820 represents a period when prior art phys are not normally synchronized and the original 10gbase-t standard did not require close synchronization (since it was not required, and interoperability is simpler if the timing requirements were less stringent).

As can be appreciated, if this value W 820 is excessively large, then it may be greater than the period between refresh signals or so large that it disrupts the LPI timing scheme by causing overlap of refresh signals. The current standard specifies a time period for transition time W that is undesirably long. Moreover, the standard may not specify an exact time, but instead just require that the transition to PAM16 occur within a maximum time period. Regardless, the unknown and potentially large time period W may disrupt the refresh scheme outlined herein.

To resolve this potential conflict, it is proposed to reduce the value W 820 to a small value. In one embodiment the value of W is zero of a value close to zero such that the PHY B transmitter transitions to PAM16 at the same time as PHY A transmitter 804 or PHY B receiver 808. In one embodiment the value of W is 1 LDPC frame. In one embodiment the value of W is less than 5 LDPC frames. In one embodiment the value of W is less than 10 LDPC frames. In one embodiment the value of W is less than 20 LDPC frames. A complete refresh cycle may comprise 512 LDPC frames with each refresh signal comprising 4 LDPC frames.

In one embodiment the transition of PHY A 804 is the transition from which one or more or all other PHY systems derive their refresh timing. In one embodiment, one channel is defined as a master and this channels transition from PAM2 to PAM16 a master transition. From this master transition all other refresh transitions may be set.

It is also contemplated that instead or in addition to minimizing or fixing the value W at a small number of LDPC frame and linking the start of the LDPC frame counter to the transition from PAM2 to PAM16, that the refresh period may be established based on when PAM16 coding is initiated by using the infofield offsets to predict exactly when this will happen. The synchronization may be based on the transition from PAM2 to PAM 16, using the frame boundaries established using the infofields. Thus in one embodiment, the system training, if starting slave silent mode (with the master transmitting), will occur with only one side transmitting and the synchronization or refresh timing will be set or occur when PAM2 synchronization occurs. Because the frame boundaries are always present, when the slave syncs to the master, the refresh timing scheme may be established. Thus, the timing may be set at this event and the LDPC and infofield frames used as a timing guide.

Other systems, methods, features and advantages of the invention will be or will become apparent to one with skill in the art upon examination of the figures and detailed description. It is intended that all such additional systems, methods, features and advantages be included within this description, be within the scope of the invention, and be protected by the accompanying claims. While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method, comprising:
   receiving, at a receiver, data from a transmitter, wherein
      the data is received via an Ethernet link,
      the data is modulated according to a first modulation scheme,
      the data is received while the receiver is in a first mode, and
      the first mode corresponds to a first power consumption level of the receiver;
   after receiving the data, receiving, at the receiver, a sleep signal from the transmitter;
   in response to receiving the sleep signal, transitioning the receiver to a second mode, wherein the second mode corresponds to a second power consumption level of the receiver that is lower than the first power consumption level;
   after transitioning to the second mode, detecting, at the receiver, an expiration of a predetermined time interval;
   in response to detecting the expiration of the predetermined time interval, transitioning the receiver to a third mode, wherein the third mode corresponds to a third power consumption level of the receiver that is greater than the second power consumption level;
   after transitioning to the third mode, receiving, at the receiver, a refresh signal from the transmitter, wherein the refresh signal is modulated according to a second modulation scheme different than the first modulation scheme;
   synchronizing the receiver to the transmitter based on the refresh signal; and
   after synchronizing the receiver to the transmitter, transitioning the receiver back to the second mode.

2. A method according to claim 1, further comprising:
   after transitioning the receiver back to the second mode, receiving, at the receiver, a wake signal from the transmitter, wherein the wake signal instructs the receiver to transition to the first mode; and
   in response to receiving the wake signal, transitioning the receiver back to the first mode.

3. A method according to claim 1, wherein receiving the sleep signal from the transmitter includes receiving a predetermined number of idle codewords from the transmitter.

4. A method according to claim 1, wherein the first modulation scheme is a pulse amplitude modulation (PAM) scheme of a first order and the second modulation scheme is a PAM scheme of a second order lower than the first order.

5. A method according to claim 1, wherein detecting the expiration of the predetermined time interval includes detecting that a predetermined counter value has been reached.

6. A method according to claim 1, wherein receiving the refresh signal from the transmitter includes receiving one or more idle packets from the transmitter.

7. A method according to claim 1, further comprising:
   after transitioning back to the second mode, detecting, at the receiver, another expiration of the predetermined time interval;
   in response to detecting another expiration of the predetermined time interval, transitioning back the receiver to the third mode;
   after transitioning back to the third mode, receiving, at the receiver, a next refresh signal from the transmitter; and
   synchronizing the receiver to the transmitter based on the next refresh signal.

8. A method according to claim 1, further comprising adapting one or more filters of the receiver based on the refresh signal.

9. A device comprising:
   a receiver configured to
      receive, from a transmitter coupled to the receiver via an Ethernet link, data while the receiver is in a first mode, wherein the first mode corresponds to a first power consumption level of the receiver, and wherein the data is modulated according to a first modulation scheme,
      after receiving the data, receive a sleep signal from the transmitter,
      in response to receiving the sleep signal, transition to a second mode, wherein the second mode corresponds to a second power consumption level of the receiver that is lower than the first power consumption level,
      after transitioning to the second mode, detect an expiration of a predetermined time interval,
      in response to detecting the expiration of the predetermined time interval, transition to a third mode, wherein the third mode corresponds to a third power consumption level of the receiver that is greater than the second power consumption level,
      after transitioning to the third mode, receive a refresh signal from the transmitter, wherein the refresh signal is modulated according to a second modulation scheme different than the first modulation scheme,
      synchronize to the transmitter based on the refresh signal, and
      after receiving the refresh signal, transition back to the second mode.

10. A device according to claim 9, wherein the receiver is further configured to:
    after transitioning back to the second mode, receive from the transmitter a wake signal instructing the receiver to transition to the first mode; and
    in response to receiving the wake signal, transition back to the first mode.

11. A device according to claim 9, wherein the receiver is configured to receive the sleep signal from the transmitter at least in part by receiving a predetermined number of idle codewords from the transmitter.

12. A device according to claim 9, wherein the first modulation scheme is a pulse amplitude modulation (PAM) scheme of a first order and the second modulation scheme is a PAM scheme of a second order lower than the first order.

13. A device according to claim 9, wherein the receiver is further configured to adapt one or more filters of the receiver based on the refresh signal.

14. A method, comprising:
generating, at a transmitter, data modulated according to a first modulation scheme;
transmitting, via the Ethernet link, the data to a receiver while the transmitter is in a first mode, wherein the first mode corresponds to a first power consumption level of the transmitter;
after transmitting the data to the receiver, transitioning the transmitter to a second mode, wherein the second mode corresponds to a second power consumption level of the transmitter that is lower than the first power consumption level;
after transitioning the transmitter to the second mode, detecting, at the transmitter, an expiration of a predetermined time interval;
in response to detecting the expiration of the predetermined time interval, transitioning the transmitter to a third mode, wherein the third mode corresponds to a third power consumption level of the transmitter that is greater than the second power consumption level;
generating, at the transmitter, a refresh signal that (i) is to be used by the receiver to synchronize to the transmitter, and (ii) is modulated according to a second modulation scheme different than the first modulation scheme;
after transitioning the transmitter to the third mode, transmitting, from the transmitter, the refresh signal to the receiver via the Ethernet link; and
after transmitting the refresh signal to the receiver, transitioning the transmitter back to the second mode.

15. A method according to claim 14, further comprising:
after transitioning the transmitter back to the second mode, transmitting, from the transmitter, a wake signal to the receiver via the Ethernet link, wherein the wake signal is configured to cause the receiver to transition to a higher power consumption mode.

16. A method according to claim 14, wherein the first modulation scheme is a pulse amplitude modulation (PAM) scheme of a first order and the second modulation scheme is a PAM scheme of a second order lower than the first order.

17. A method according to claim 14, wherein generating the refresh signal includes generating one or more idle packets.

18. A device comprising:
a transmitter configured to
generate data modulated according to a first modulation scheme,
transmit, via an Ethernet link, the data to a receiver while the transmitter is in a first mode, wherein the first mode corresponds to a first power consumption level of the transmitter,
after transmitting the data to the receiver, transition to a second mode, wherein the second mode corresponds to a second power consumption level of the transmitter that is lower than the first power consumption level,
after transitioning to the second mode, detect an expiration of a predetermined time interval,
in response to detecting the expiration of the predetermined time interval, transition to a third mode, wherein the third mode corresponds to a third power consumption level of the transmitter that is greater than the second power consumption level,
generate a refresh signal that (i) is to be used by the receiver to synchronize to the transmitter, and (ii) is modulated according to a second modulation scheme different than the first modulation scheme,
after transitioning to the third mode, transmit the refresh signal to the receiver via the Ethernet link, and
after transmitting the refresh signal to the receiver, transition back to the second mode.

19. A device according to claim 18, wherein the transmitter is further configured to, after transitioning back to the second mode, transmit a wake signal to the receiver via the Ethernet link, wherein the wake signal is configured to cause the receiver to transition to a higher power consumption mode.

20. A device according to claim 19, wherein the transmitter is configured to generate the refresh signal at least in part by generating one or more idle packets.

* * * * *